3,323,231
SELF-GRADING FACILITY FOR MULTIPLE-CHOICE EXAMINATION
Donald E. Tuttle, 821 St. Johns St., Elgin, Ill. 60120
Filed Feb. 15, 1965, Ser. No. 432,503
3 Claims. (Cl. 35—48)

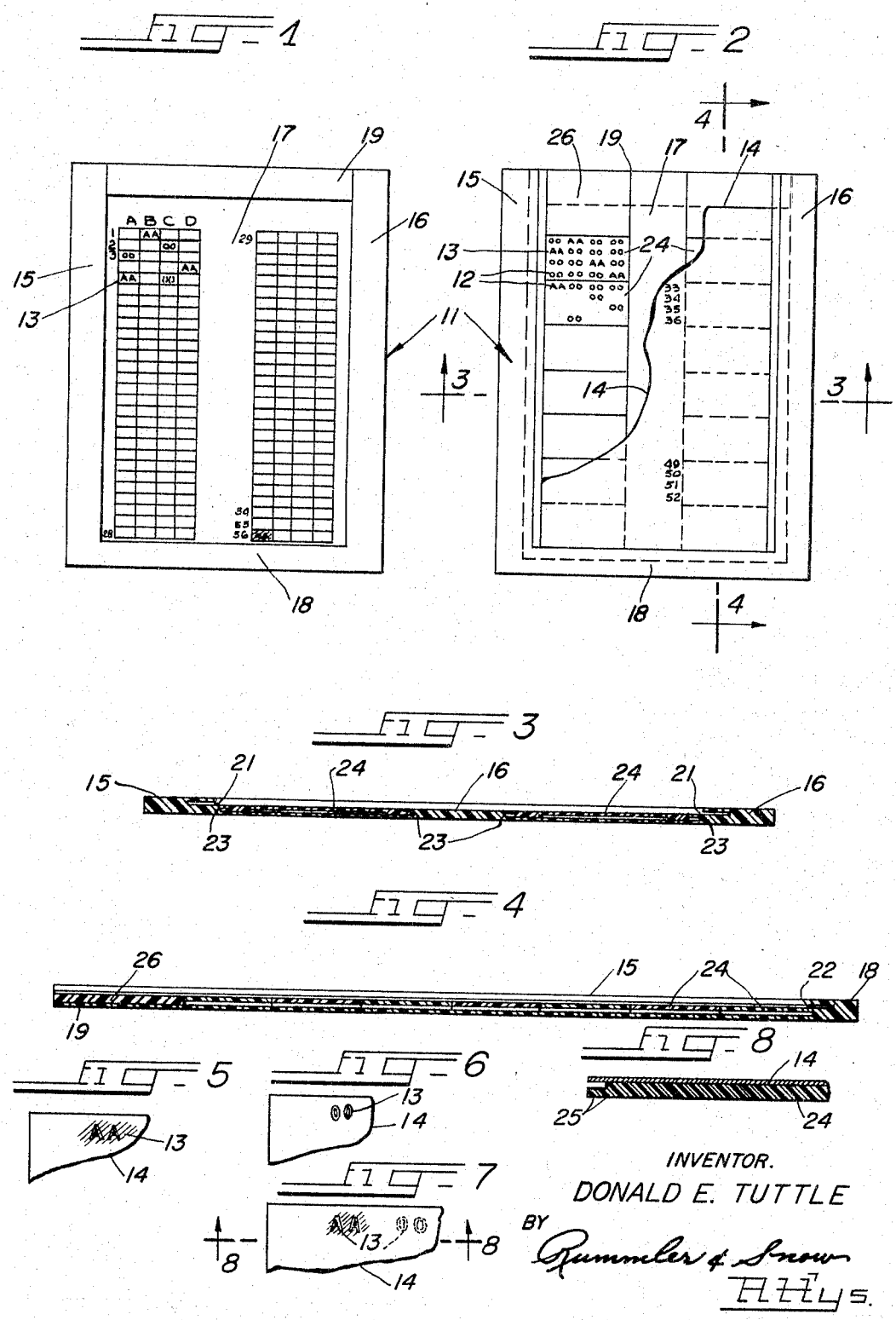
June 6, 1967     D. E. TUTTLE     3,323,231
SELF-GRADING FACILITY FOR MULTIPLE-CHOICE EXAMINATION
Filed Feb. 15, 1965
INVENTOR.
DONALD E. TUTTLE

United States Patent Office 3,323,231
Patented June 6, 1967

This invention relates to a facility for accelerating the self-grading of response of students to multiple-choice examination questions.

The main objects of this invention are: to provide an improved self-grading facility for use with multiple-choice examination questions; to provide an improved facility of this kind involving a panel exposing a series of indicia for use in creating impressions on pressured portions of an overlain sheet of paper; to provide a panel of this kind for inserting a sheet of paper with columnar blanks arranged for registration with the indicia on the panel for students to pressure on the paper an impression of one of a plurality of indicia which the student believes is the right choice of a particular multiple-choice question; to provide a facility of this kind wherein groups of the indicia are formed on a predetermined number of separate units which may be variously positioned relative to each other on the panel to alter their relationship between successive uses of the facility; to provide improved means for lining the paper with columnar blanks in proper registration with the several series of indicia; and to provide an improved self-grading facility of this kind of such simple structure as to make very inexpensive its manufacture and very gratifying its use to the instructor and to the student.

In the adaptation shown in the accompanying drawings:

FIG. 1 is a plan view of the simplest form of a two-column four-choice facility constructed in accordance with this invention;

FIG. 2 is a plan view of a modified form of a two-column, four-choice facility, constructed in accordance with this invention, wherein the four horizontal series of indicia are arranged on several separate units;

FIG. 3 is an enlarged, transverse, sectional view of the panel taken on the plane of the line 3—3 of FIG. 2;

FIG. 4 is a longitudinal, sectional view taken on the plane of the line 4—4 of FIG. 2;

FIG. 5 is an enlarged, fragmentary view of the left-hand corner of a piece of paper overlain on one of the units of FIG. 2 showing the pencilled impression of the one in the row of indicia which represents the correct choice of a multiple-choice question;

FIG. 6 is a view similar to FIG. 5 but showing the pencilled impression of one in the row of indicia which represents an incorrect selection of a multiple-choice question;

FIG. 7 is a view similar to FIG. 5 illustrating the pencilled impression of a correct answer made on an overlain piece of paper, with the dotted outline indicating the next adjacent of the indicia on the unit representative of an incorrect choice; and FIG. 8 is an enlarged, fragmentary, cross-sectional view taken on the plane of the line 8—8 of FIG. 7.

The essential concept of this invention involves a panel on the face of which is formulated a vertical series of transverse rows of indicia one only of which in each row represents the correct choice for a multiple-choice question, the choice being made by a student's pressured impression thereof on the overlain columnar sheet.

A self-grading facility for multiple-choice questions embodying the foregoing concept comprises a panel 11 whereon is arranged a vertical series of transverse rows 12 of a predetermined number of indicia 13 one of which represents the correct-choice answer and the others of which represent incorrect-choice answers and subject to having selective impressions registered on a sheet 14 overlain on the indicia 13.

The panel 11 may be made from stiff cardboard or from any of the available plastics. Where there is to be extensive use of the facility, the plastic materials would be preferred.

In either of the two adaptations, as indicated in FIGS. 1 and 2, the transverse rows 12 of intagliated indicia 13 are uniformly spaced in two vertical series between lateral marginal portions 15 and 16 and a median strip 17 and inwardly from lower and upper marginal portions 18 nd 19.

The exposed faces of the respective rows 12 of intagliated indicia 13 are coplanar with the face of the median strip 17 which is set below the exposed faces of the marginal portions 16, 17, 18 and 19.

In either adaptation the lateral marginal portions 15 and 16 and the base marginal portion 18 have slots 21 and 22 respectively, extending outwardly from their inner perimeters in a common plane (FIGS. 3 and 4). Such slots 21 and 22 are dimensioned and positioned in the panel 11 to seat the marginal portions of the sheet 14 and dispose it in contact with the intagliated face of the panel 11 to permit pencilling on the sheet impressions of selected indicia. The upper marginal portion 19 has its exposed face coplanar with the face of the median strip 17 and, consequently, with the bottoms of the slots 21 and 22. This is required to permit the lateral edges of the sheet 14 to slide easily into the slots 21 with the bottom edge of the sheet seated into the slot 22.

Below these slots 21 and 22 are other slots 23 (FIG. 3) extending outwardly from the inner marginal portions 15 and 16 of the panel and directly below but inwardly of the slots 21 and 22. The slots 23 are provided for the positioning of the hereinafter described units 24.

The intagliated indicia 13 are of two types, double "AA" and double "OO." The one "AA" in each row 12 represents the correct, or preferred, choice of a multiple-choice question. The three "OO" represents the incorrect, or less-desired, choice. Obviously, other types of indicia could be employed. As is apparent from FIGS. 1 and 2, the sequence of these "AA" indicia with respect to the "OO" varies. Such sequence, obviously, depends upon the position of the choice or preferred answer to a multiple-choice question.

In the adaptation shown in FIG. 1 the rows 12 of indicia 13 formed on individual strips which are set within the base of the panel 11 flush with the median strip 17.

In the adaptation shown in FIGS. 2–8 four rows 12 of indicia 13 are intagliated on a plurality of separate units 24. These units 24 are formed with outwardly-extending flanges 25 (FIG. 8) for seating in the slots 23 under the lateral marginal portions 15 and 16 of the panel 12 and below the slots 21 and 22 (FIG. 3). Such separate units 24 make it possible to rearrange them in their vertical sequence, or in one or the other columns. This precludes a student from benefit of memorizing the positions and relative sequences of the "AA" to the "OO", as might be attempted by students with acute memories.

Once the arrangement of the units 24 has been established on the panel 11, they are held in place by similarly-shaped blank plates 26. One each of these plates 26 is inserted in the slots 21 to abut the uppermost of the stack of units 24 with the outer edge of the plate 26 flush with the perimeter of the upper marginal portion 19 of the panel 11.

The sheet 14 may be any available paper. It should be opaque enough to preclude the indicia 13 appearing therethrough. Such a sheet 14 is ruled vertically and transversely to provide a series of blank spaces 26 dimensioned to register with the rows 22 of indicia 13. Numerals are arranged seriatim along one margin of these vertical series of blank spaces to correspond with the number of questions likely to be involved in the usual type of examination.

A self-grading facility of this kind is used in the following manner:

The student taking an examination is handed a panel 11 with an appropriate columnar sheet fixed in place over the indicia. The lateral edges of the sheets 14 will be inserted in the slots 21 and the bottom edge of the sheet 14 will be inserted in the slot 22. This will locate the columnar blank spaces in perfect registration with the several rows 12 of indicia 13.

The student, then, is presented with a numbered set of questions for each of which there is listed four classes purported to bear some relation to the subject matter of the question. One of these clauses is the superior, if not the only correct, choice to the question. Such a series of questions may be handed to the student or they may be presented orally, as the circumstances require.

The student decides which of the four clauses is the superior, or only correct, choice. Thereupon, with a pencil in hand, the student shades the appropriate blank space. If the "AA" shows through, the student immediately knows that he has made the correct selection. If the "OO" shows through, the student knows he has failed in the correct evaluation of the problem.

To test the students' aptitude, they would be instructed that if an incorrect selection shows through on the sheet 14, they are to continue shading in the same line until they find the correct answer. Thus the instructor would immediately ascertain the students' aptitude. If too many students had the line substantially shaded, the instructor would know, as a rule, either the question was not phrased correctly or the instructor did not teach the subject matter relating to the subject matter of the question thoroughly enough.

Should the student assume that, with no one looking on, he could erase the incorrect shading and make another try, he is doomed to disappointment—and embarrassment. Even with a good eraser, and if the shading were done with a very soft lead, there will remain on the sheet 14 a telltale impression of the first choice.

The benefits of such a facility are twofold. First, the student knows instantly the extent to which he has made the right or wrong choices on an examination. If over-all grading is required, or desired, the student quickly can determine the ratio of right and wrong choices to the total number of questions propounded. Secondly, the teacher has no need to pick up a batch of papers from a class and spend further time grading.

In the event the situation requires having the test sheet 14 remain in the panel, and handed in therewith, means may be employed to prevent the easy removal of a sheet 14. A most simple means would be the use of a strip of adhesive tape laid across the upper edge of the sheet 14 and the adjacent face of the marginal portion 19 of the panel.

It should now be obvious that only two vertical columns of indicia may be employed if a true or false series of questions are propounded and that the intagliated indicia may take forms other than "OO" of "AA" such as "TT" or "FF"; or "CC" or "II", or similar letters and/or numbers, etc.

It will be understood that numerous details of the construction shown may be altered or omitted without departing from the spirit of the invention as defined by the following claims.

I claim:

1. A self-grading facility for use with multiple-choice examination questions comprising, a panel having a vertical series of transverse rows of several indicia wherein only one of which indicia represents the correct choice, said indicia are intagliated on the face of said panel, and marginal means for temporarily superimposing over the series of indicia a removable columnar sheet in direct contact with the panel whereon to permit the use of a marking instrument to pressure an impression on the exposed face of the sheet one or more indicia in the series to determine the correct choice for the respective question.

2. A self-grading facility for use with multiple-choice examination questions comprising, a single panel of rectangular contour having a medial strip with the exposed face thereof disposed below the faces of the lateral marginal portions, and having opposed slots extending oppositely outward in a plane below the face of the median strip, and having other slots extending oppositely outward under the marginal portions of the panel above the plane of the first mentioned slots, and also having a slot extending outwardly under the base marginal portion of the panel in the plane of the first mentioned slots, a plurality of thin, rectangular, planar units having several transverse rows of multiple indicia intagliated on the face thereof, one of which indicia in each row differs from the other identical indicia to represent the correct choice, and having flanges extending oppositely outward from the lateral edges and dimensioned for sliding reception in the other panel slots to position the units in variable relationship between the median strip and the lateral portions of the panel, and a sheet of material having columnar blank spaces thereon superimposed directly on the panel with the edges of the sheet seated under the first-mentioned opposed slots to retain the sheet in place with the blank spaces registering with the rows of indicia, to permit a student in an examination on multiple-choice questions to effect in the appropriate spaces by a marking instrument an impression of the one indicia in each row which the student selects to be the correct choice.

3. A self-grading facility as set forth in claim 2 wherein numerals are arranged seriatim along one margin of the columnar blank spaces to correspond with the sequence of the questions wherein the student is to be examined.

References Cited

UNITED STATES PATENTS

| | | | |
|---|---|---|---|
| 1,928,565 | 9/1933 | Kindig | 35—48 |
| 2,540,363 | 2/1951 | Wistar | 35—48 |

EUGENE R. CAPOZIO, *Primary Examiner.*

R. E. KLEIN, R. W. WEIG, *Assistant Examiners.*